US011729028B2

(12) United States Patent
Kleinerman et al.

(10) Patent No.: US 11,729,028 B2
(45) Date of Patent: Aug. 15, 2023

(54) SYSTEM AND METHOD FOR BLIND CHANNEL ESTIMATION AND COHERENT DIFFERENTIAL EQUALIZATION IN AN ORTHOGONAL FREQUENCY DIVISION MULTIPLEXING (OFDM) RECEIVER

(71) Applicant: Skyworks Solutions, Inc., Irvine, CA (US)

(72) Inventors: Alexander Kleinerman, Austin, TX (US); Bradley Arthur Wallace, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 177 days.

(21) Appl. No.: 17/124,561

(22) Filed: Dec. 17, 2020

(65) Prior Publication Data

US 2022/0200825 A1    Jun. 23, 2022

(51) Int. Cl.
| | |
|---|---|
| *H04L 25/02* | (2006.01) |
| *H04L 27/06* | (2006.01) |
| *H04B 17/309* | (2015.01) |
| *H04L 27/26* | (2006.01) |
| *H04L 25/06* | (2006.01) |

(52) U.S. Cl.
CPC ...... *H04L 25/0238* (2013.01); *H04L 25/0204* (2013.01); *H04L 25/0236* (2013.01); *H04L 25/067* (2013.01); *H04L 27/2636* (2013.01)

(58) Field of Classification Search
None
See application file for complete search history.

(56) References Cited

U.S. PATENT DOCUMENTS

| 8,385,438 | B1* | 2/2013 | Cheng | H04L 27/2665 |
| | | | | 375/343 |
| 9,742,611 | B2 | 8/2017 | Elenes | |
| 11,057,249 | B1* | 7/2021 | Hawkes | H04L 25/067 |
| 2005/0163238 | A1* | 7/2005 | Fujii | H04L 5/0007 |
| | | | | 375/E1.005 |

(Continued)

OTHER PUBLICATIONS mathworks.com, "Channel Estimation—MATLAB & Simulink," Oct. 10, 2020, 8 pages total.

(Continued)

*Primary Examiner* — Duc T Duong
(74) *Attorney, Agent, or Firm* — Knobbe, Martens, Olson & Bear, LLP (57) ABSTRACT

In one aspect, an apparatus includes: a fast Fourier transform (FFT) engine to receive and convert a plurality of orthogonal frequency division multiplexing (OFDM) samples into a plurality of frequency carriers; a detector coupled to the FFT engine to determine a channel estimate for a first frequency carrier using a first channel estimate for the first frequency carrier and a plurality of other channel estimates, each of the plurality of other channel estimates for one of a plurality of neighboring frequency carriers within an evaluation window, and determine a log likelihood ratio (LLR) for the first frequency carrier using the channel estimate for the first frequency carrier; and a decoder coupled to the detector to decode a first OFDM symbol comprising the first frequency carrier using the LLR for the first frequency carrier.

20 Claims, 8 Drawing Sheets

(56) References Cited

U.S. PATENT DOCUMENTS

| | | | | |
|---|---|---|---|---|
| 2011/0158334 A1* | 6/2011 | Arambepola | ......... | H04L 25/022 375/260 |
| 2012/0076214 A1* | 3/2012 | Wei | ............ | H04L 25/0204 375/259 |
| 2013/0051444 A1* | 2/2013 | Roh | ............ | H03M 13/6591 714/780 |
| 2014/0211833 A1* | 7/2014 | Schoeneich | ......... | H04L 25/0232 375/346 |
| 2015/0063506 A1* | 3/2015 | Niu | ............ | H04L 25/0232 375/346 |
| 2015/0117509 A1* | 4/2015 | Hasegawa | ......... | H04L 27/26526 375/232 |
| 2017/0155528 A1* | 6/2017 | Alexander | ............ | H04L 25/022 |
| 2019/0074947 A1* | 3/2019 | Zhang | ............ | H04L 5/0048 |
| 2020/0013420 A1 | 1/2020 | Wallace et al. | | |

OTHER PUBLICATIONS berkley.edu, "E225C—Lecture 16, OFDM Introduction," Date Unknown, 15 pages total.

U.S. Appl. No. 17/104,054, filed Nov. 25, 2020, entitled, "System and Method for Efficient Timing Estimation and Tracking in an Orthogonal Frequency Division Multiplexing (OFDM) Communication System," by Alexander Kleinerman.

U.S. Appl. No. 17/104,063, filed Nov. 25, 2020, entitled, "System and Method for Detecting of Channel Conditions and Channel Estimation in an Orthogonal Frequency Division Multiplexing (OFDM) Receiver," by Alexander Kleinerman.

U.S. Appl. No. 17/122,042, filed Dec. 15, 2020, entitled, "System, Apparatus and Method for Cancelling Tonal Interference in an Orthogonal Frequency Division Multiplexing (OFDM) Receiver," by Alexander Kleinerman.

* cited by examiner

SYSTEM AND METHOD FOR BLIND CHANNEL ESTIMATION AND COHERENT DIFFERENTIAL EQUALIZATION IN AN ORTHOGONAL FREQUENCY DIVISION MULTIPLEXING (OFDM) RECEIVER

BACKGROUND

Radio receivers are omnipresent in modern technology. In addition to standalone radios for receipt of broadcast radio signals, all manners of tech and non-tech devices include some type of radio receiver (and often paired with a transmitter). Such modem circuitry is present in any device having wireless capabilities. While some broadcast radio signals are transmitted with analog modulation (e.g., conventional AM and FM signals), other terrestrial and satellite wireless communication systems use some type of digital modulation. Some example digital radio systems include National Radio System Committee (NRSC-5C, also known as HD™ radio), Digital Audio Broadcasting (DAB), Digital Radio Mondiale (DRM) or other standard.

Channel estimation is an operation performed in a receiver to determine channel conditions. In some example digital radio communication systems, message information is communicated in orthogonal frequency division multiplexing (OFDM) symbols. Unlike certain other digital radio communication systems, in a DAB system there are no pilot symbols or other reference information communicated within a signal stream that can be used for purposes of determining channel conditions by way of a channel estimate. In DAB differential modulation is used so non-coherent demodulation without channel estimation is typically performed, but such demodulation has lower performance than coherent demodulation.

SUMMARY OF THE INVENTION

In one aspect, an apparatus includes: a front end circuit to receive incoming radio frequency (RF) signals and process the incoming RF signals into orthogonal frequency division multiplexing (OFDM) samples of a plurality of OFDM symbols; a fast Fourier transform (FFT) engine coupled to the front end circuit, the FFT engine to receive the plurality of OFDM samples and convert the plurality of OFDM samples into a plurality of frequency carriers; a detector coupled to the FFT engine, the detector to determine a channel estimate for a first frequency carrier using a first channel estimate for the first frequency carrier and a plurality of other channel estimates, each of the plurality of other channel estimates for one of a plurality of neighboring frequency carriers within an evaluation window, and determine a log likelihood ratio (LLR) for the first frequency carrier using the channel estimate for the first frequency carrier; and a decoder coupled to the detector to decode a first OFDM symbol comprising the first frequency carrier using the LLR for the first frequency carrier.

In an example, the detector is to determine the channel estimate for the first frequency carrier comprising an average value determined using the first channel estimate and the plurality of other channel estimates. The evaluation window may include a first plurality of frequency carriers of the first OFDM symbol and a second plurality of frequency carriers of a second OFDM symbol adjacent to the first OFDM symbol.

In an example, the detector is to: calculate a plurality of metrics for the first frequency carrier and the plurality of neighboring frequency carriers within the evaluation window; and determine the LLR for a pair of frequency carriers comprising the first frequency carrier and a second frequency carrier based at least in part on the plurality of metrics. The detector may determine the LLR for the pair of frequency carriers comprising the first frequency carrier and the second frequency carrier comprising: for a first bit of the first OFDM symbol, a difference between a first maximum metric of the plurality of metrics for a first value for the first bit and a second maximum metric of the plurality of metrics for a second value for the first bit; and for a second bit of the first OFDM symbol, a difference between a first maximum metric of the plurality of metrics for the first value for the second bit and a second maximum metric of the plurality of metrics for the second value for the second bit.

In an example, the detector may include: a channel estimation circuit to generate a plurality of channel estimates for the first frequency carrier, the plurality of channel estimates including the first channel estimate; and a channel estimation smoother to determine the channel estimate for the first frequency carrier using the first channel estimate and the plurality of other channel estimates. The detector may also include: a metric calculator coupled to the channel estimation smoother to calculate the plurality of metrics using the first channel estimate; and a buffer to store the plurality of metrics. The detector may further include a determination circuit coupled to the metric calculator to determine the LLR for the pair of frequency carriers and the plurality of neighboring frequency carriers within the evaluation window.

In another aspect, a method includes: determining, in a channel estimation circuit of a receiver, a plurality of channel estimates within an evaluation window having a plurality of frequency carriers including a first frequency carrier, each of the plurality of channel estimates for one of the plurality of frequency carriers; calculating, in a calculation circuit of the receiver, a plurality of metrics for each of the plurality of frequency carriers using at least some of the plurality of channel estimates; and determining a soft decision for the first frequency carrier based at least in part on the plurality of metrics.

Determining a first channel estimate for the first frequency carrier may include calculating an average of an initial channel estimate for the first frequency carrier and initial channel estimates for a plurality of other frequency carriers of the plurality of frequency carriers. The method may include selecting the initial channel estimate for the plurality of other frequency carriers comprising a channel estimate closest to the initial channel estimate for the first frequency carrier.

In an example, calculating the plurality of metrics comprises: calculating a LLR metric for each of the plurality of frequency carriers of the evaluation window, the first LLR metric corresponding to a likelihood that a first bit of a modulation point of the frequency carrier is a first value; calculating a second LLR metric for each of the plurality of frequency carriers of the evaluation window, the second LLR metric corresponding to a likelihood that the first bit of the modulation point is a second value; calculating a third LLR metric for each of the plurality of frequency carriers of the evaluation window, the third LLR metric corresponding to a likelihood that a second bit of the modulation point is the first value; and calculating a fourth LLR metric for each of the plurality of frequency carriers of the evaluation window, the fourth LLR metric corresponding to a likelihood that the second bit of the modulation point is the second value.

In an example, the method further comprises determining a first LLR value and a second LLR value based at least in part on the first LLR metric, the second LLR metric, the third LLR metric, and the fourth LLR metric. The soft decision may include the first LLR value and the second LLR value. The method may further include performing coherent demodulation for a differentially encoded quadrature phase shift keying orthogonal frequency division multiplexing symbol using the soft decision.

In yet another aspect, an apparatus comprises: means for determining a plurality of channel estimates within an evaluation window having a plurality of frequency carriers including a first frequency carrier, each of the plurality of channel estimates for one of the plurality of frequency carriers; means for calculating a plurality of metrics for each of the plurality of frequency carriers using at least some of the plurality of channel estimates; and means for determining a soft decision for the first frequency carrier based at least in part on the plurality of metrics. In an example, the means for determining is to calculate an average of an initial channel estimate for the first frequency carrier and initial channel estimates for a plurality of other frequency carriers of the plurality of frequency carriers.

The apparatus may further include means for selecting the initial channel estimate for the plurality of other frequency carriers comprising a channel estimate closest to the initial channel estimate for the first frequency carrier. The means for calculating may include: means for calculating a first LLR metric for each of the plurality of frequency carriers of the evaluation window, the first LLR metric corresponding to a likelihood that a first bit of a modulation point of the frequency carrier is a first value; means for calculating a second LLR metric for each of the plurality of frequency carriers of the evaluation window, the second LLR metric corresponding to a likelihood that the first bit of the modulation point is a second value; means for calculating a third LLR metric for each of the plurality of frequency carriers of the evaluation window, the third LLR metric corresponding to a likelihood that a second bit of the modulation point is the first value; and means for calculating a fourth LLR metric for each of the plurality of frequency carriers of the evaluation window, the fourth LLR metric corresponding to a likelihood that the second bit of the modulation point is the second value.

The apparatus may further include means for determining a first LLR value and a second LLR value based at least in part on the first LLR metric, the second LLR metric, the third LLR metric, and the fourth LLR metric.

DETAILED DESCRIPTION

In various embodiments, a radio receiver is implemented with a differential detector circuit that is configured to efficiently estimate a channel for an incoming radio frequency (RF) signal and to generate soft decisions based at least in part on the channel estimates. Embodiments may be used in a variety of receiver implementations for determining and using channel estimates to obtain soft decisions for incoming orthogonal frequency division multiplexing (OFDM) communications. While embodiments are not limited in this regard, implementations may be used in connection with a Digital Audio Broadcast (DAB) digital radio communication system according to a given specification. Other implementations can be used in connection with other digital communication techniques, including wireless local area networks or other receivers using OFDM signaling.

While a differential detector circuit can be implemented in different manners, in embodiments herein this circuit may be implemented as part of a receiver signal processing path that receives downconverted digitized symbols in the frequency domain (after conversion from the time domain to the frequency domain). With embodiments, a blind channel estimate can be performed based on the knowledge that an incoming symbol provides information of one of a limited set of known values. Using this channel estimation allows coherent demodulation to occur, which gives a performance gain over non-coherent demodulation.

An OFDM signal is processed mostly in the frequency domain. Due to the properties of OFDM modulation in which message information includes a cyclic prefix and message content, each signal can be presented as:

$$Y_i = X_i H_i + N_i \quad \text{[Equation 1]}$$

where:

Y_i is the complex value of an input signal at frequency i,

H_i is the complex value of the channel at frequency i,

X_i is the complex value of the transmitted modulation symbol i, and N_i is the complex gaussian noise sample.

The goal of channel estimation is to estimate $H_i$ for every data cell on a time-frequency grid. In an DAB symbol stream in which differentially encoded quadrature phase shift keying (DEQPSK) OFDM symbols are communicated, there are no pilot or other reference signals at known locations that can be used for determining channel estimations. As such, channel estimates may be performed according to a blind channel estimation technique where the fact that an incoming symbol can present one of four possible values (namely one of four 2-bit combinations) can be leveraged.

Figure 1A:
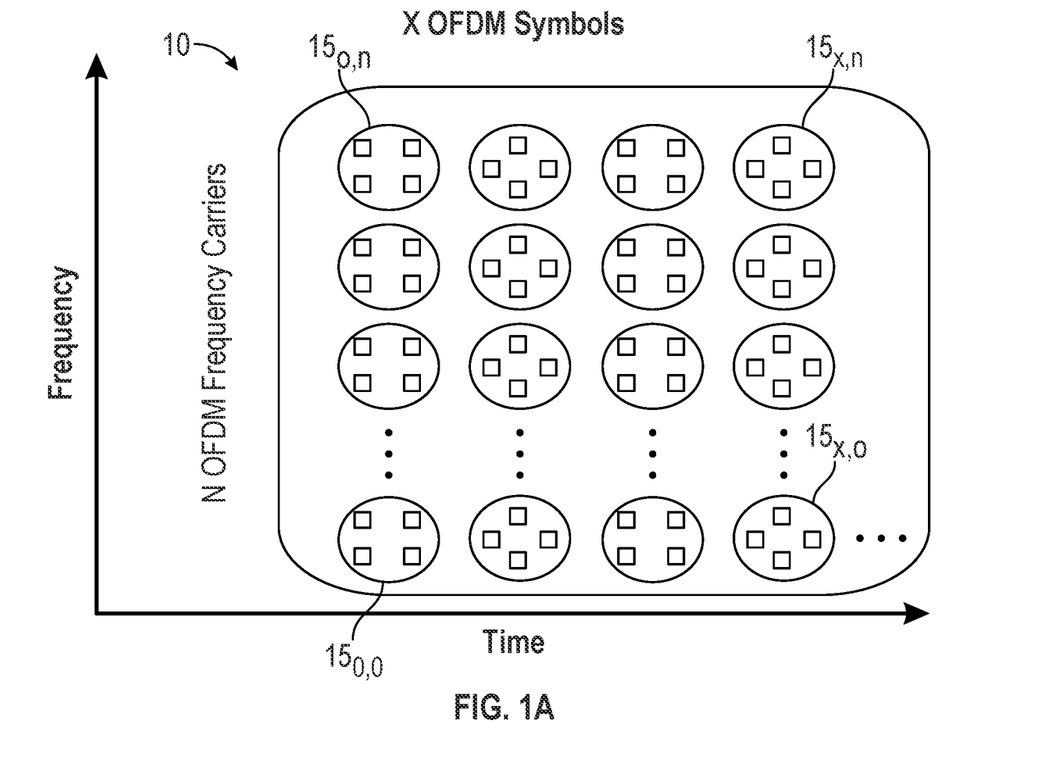
FIG. 1A is a graphical illustration of a plurality of frequency carriers in accordance with an embodiment.

Referring now to FIG. 1A, shown is a graphical illustration of a plurality of frequency carriers for multiple OFDM symbols having DEQPSK modulation. More specifically as shown in FIG. 1A, graphical illustration 10 includes multiple OFDM symbols (e.g., X OFDM symbols) $15_0$-$15_x$.

After conversion from the time domain to the frequency domain, each OFDM symbol 15 is represented by a plurality of OFDM frequency carriers (e.g., N frequency carriers) such that each OFDM symbol 15 is represented by a plurality of frequency carriers $15_{0,0}$-$15_{0,n}$. Note that the four constellation points of each succeeding OFDM symbol 15 are phase shifted from its predecessor by 45°. In a DEPSK modulation scheme, information is encoded in the change of phase of every frequency carrier 15. In a DAB system implementation, a communication frame may include 76 OFDM symbols, where each OFDM symbol is transformed, e.g., in a fast Fourier transform (FFT) engine, into 2048 frequency bins, with 1536 frequency bins carrying data.

Figure 1B:
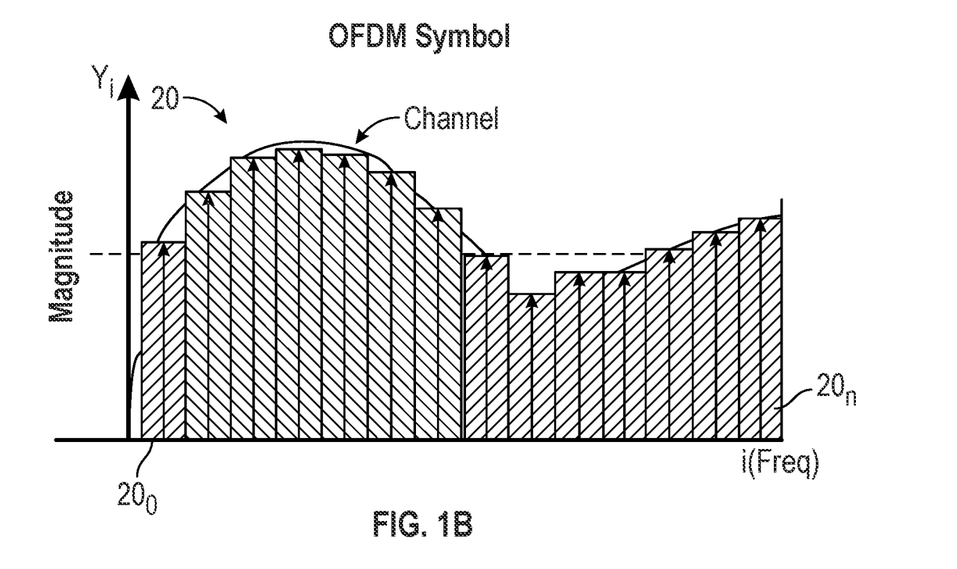
FIG. 1B is a graphical illustration of a received signal via a channel in accordance with an embodiment.

Referring now to FIG. 1B, shown is a graphical illustration of a received signal via a channel. As shown in FIG. 1B, an OFDM symbol 20, after conversion to the frequency domain, includes a plurality of frequency carriers $20_0$-$20_n$. Given a channel having some level of impairment, frequency carriers 20 have different magnitudes and phases.

Figure 2:
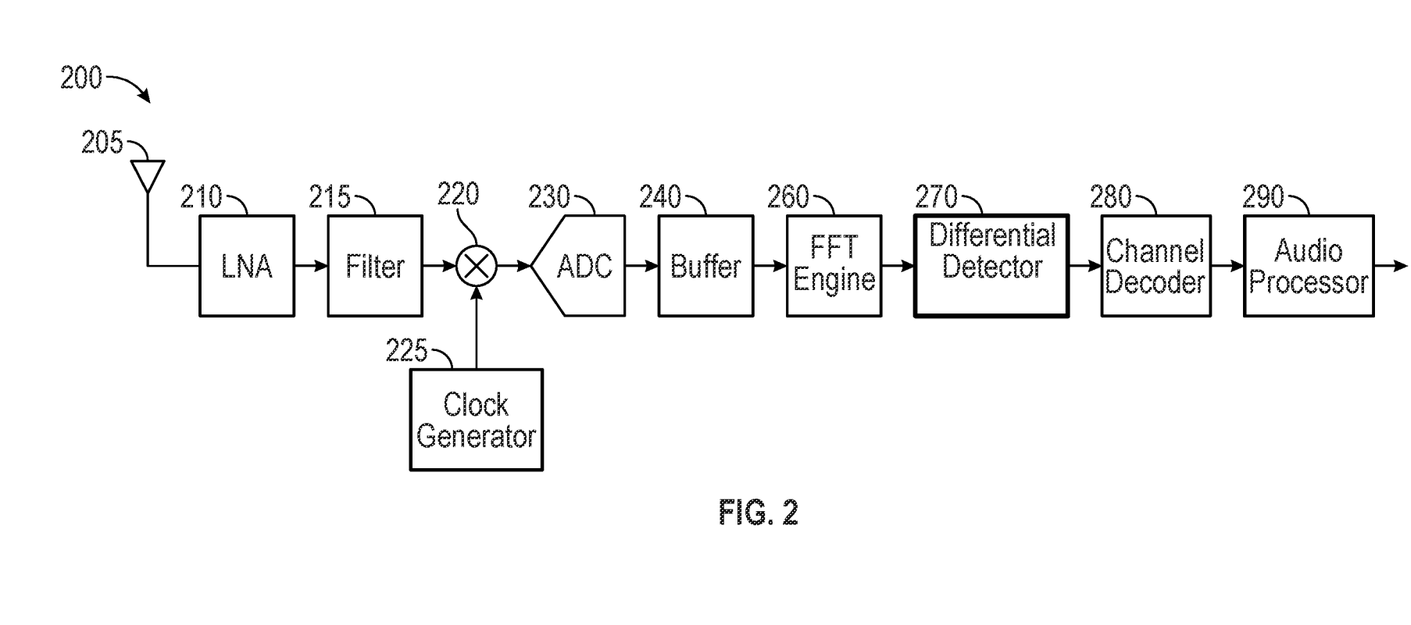
FIG. 2 is a block diagram of a receiver in accordance with an embodiment.

Referring now to FIG. 2, shown is a block diagram of a receiver in accordance with an embodiment. As shown in FIG. 2, receiver 200 may include a signal processing path having various components. Embodiments can be incorporated in different types of receiver systems. In some embodiments, receiver 200 may be a single-die integrated circuit such as a CMOS die having mixed signal circuitry including both analog and digital circuitry.

With reference to receiver 200, an incoming RF signal that includes digital radio signals according to a given digital broadcast specification may be received over the air via an antenna 205. As used herein, the terms "digital radio" or "digital radio broadcast signal" are used interchangeably and are intended to correspond to broadcast radio communication that occurs digitally. Such communications may be in accordance with various standards such as a DAB or other standard.

As shown in FIG. 2, an incoming RF signal received via antenna 205 is provided to a low noise amplifier (LNA) 210, which amplifies the RF signal. In turn, LNA 210 is coupled to a filter 215, which may perform filtering of the received RF signal. Understand while shown with two RF front end blocks, a receiver may include additional RF front end circuitry in other examples. In turn, the filtered RF signal is provided to a mixer 220, which in an embodiment may be implemented as a complex mixer. In embodiments herein mixer 220 may downconvert the RF signal to a lower frequency signal using a mixing signal received from a clock generator 225. In an embodiment, clock generator 225 may be implemented as a local oscillator, phase lock loop or other such clock generation circuit. In a particular embodiment, this lower frequency signal may be, e.g., a low-intermediate frequency (IF) or zero-IF signal. This downconverted signal is an in-phase/quadrature phase (IQ) signal.

The resulting downconverted signal is provided to an analog-to-digital converter (ADC) 230, where the signal can be digitized into a digital signal. Note that in some embodiments, either before or after digitization, channelization may be performed to generate a channelized signal. In an OFDM system, a plurality of samples forms an OFDM symbol of an incoming data stream.

In turn, samples are provided to a buffer 240, which may be implemented as a first in first out (FIFO). The incoming samples are stored in buffer 240, and are then output to a main digital signal processing path including a fast Fourier transform (FFT) engine 260, which generates frequency domain OFDM symbols from incoming time domain OFDM symbols. In one embodiment, each incoming time domain OFDM symbol can be processed by FFT engine 260 into a plurality of frequency carriers. Note that the number of frequency carriers corresponding to a given OFDM symbol may vary depending upon a particular radio standard, bandwidth of the signal and time duration of the OFDM symbol (without cyclic prefix).

As further shown in FIG. 2, frequency carriers generated in FFT engine 260 are provided to a differential detector 270. In embodiments herein, differential detector 270 may be a dedicated hardware circuit or a microcontroller or other control logic to execute instructions stored in a non-transitory storage medium such as firmware and/or software instructions. Differential detector 270 may be implemented as a coherent differential equalizer to perform channel estimations and use the channel estimate information to generate soft decisions, e.g., in the form of log likelihood ratio (LLR) values, as described herein. Of course, differential detector 270 could be implemented in different ways in other embodiments.

In embodiments herein, differential detector 275 may generate LLR values for each pair of frequency carriers of the OFDM symbol. In turn, these LLR values may be provided to a channel decoder 280. In an embodiment, channel decoder 280 may be implemented as a Viterbi decoder to decode encoded message information based at least in part on the LLR values. Channel decoder also may be used to perform error correction and information bit extraction. The resulting demodulated signal may be provided to an audio processor 290 for audio processing. The encoded audio signal is then provided to an audio source decoder (not shown for ease of illustration in FIG. 2) to generate source audio. Although shown as individual components, understand that portions of the receiver after ADC 230 to the end of the signal processing path of FIG. 2 can be implemented in a digital signal processor (DSP).

Figure 3:
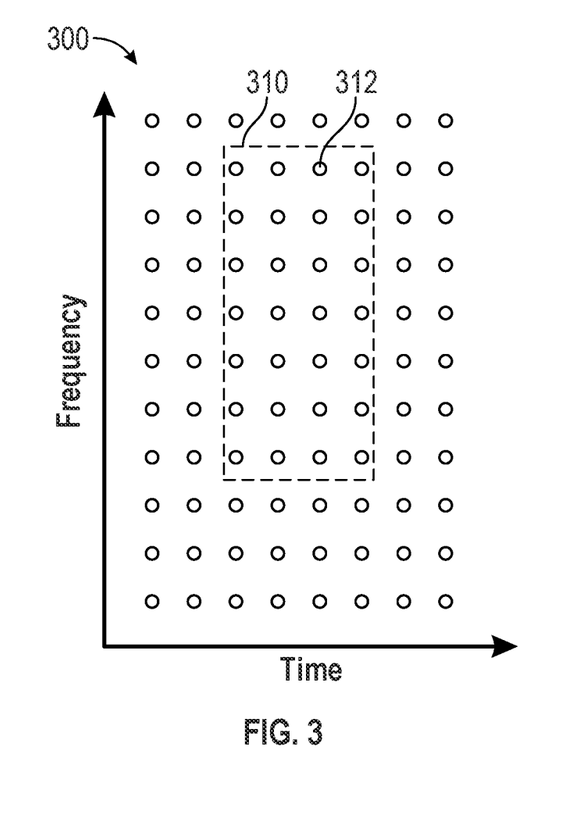
FIG. 3 is a graphical illustration of a plurality of OFDM modulated frequency carriers in accordance with an embodiment.

Referring now to FIG. 3, shown is a graphical illustration of a plurality of OFDM modulated frequency carriers in accordance with an embodiment. As shown in FIG. 3, graphical illustration 300 shows a plurality of frequency carriers 312 (only a representative one of which is enumerated in FIG. 3). As illustrated, for each time instant (on the X-axis) representing an OFDM symbol, a plurality of frequency carriers 312 are provided (illustrated on the y-axis)

As further shown in FIG. 3, an evaluation window 310 is present. As will be described herein, samples within evaluation window 310 may be processed in determining LLR values for a given one or more of frequency carriers 312 within evaluation window 310. As such, evaluation window 310 may act as a moving window to enable efficient and accurate determination of LLR values for given frequency carriers. This is so, as typically the channel changes slowly in both frequency and time. As such, it may be assumed that within an evaluation window such as evaluation window 310, the channel is approximately constant.

Figure 4A:
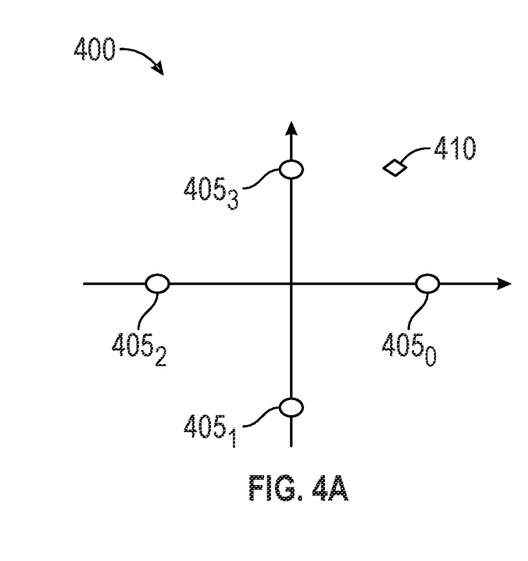
FIG. 4A is a graphical illustration of a channel estimation for a frequency carrier in accordance with an embodiment.
Figure 4B:
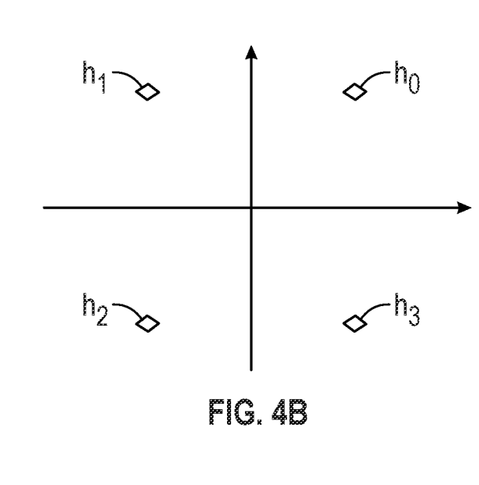
FIG. 4B is a graphical illustration of four possible channel estimates in accordance with an embodiment.

Referring now to FIG. 4A, shown is a graphical illustration of a channel estimation for a frequency carrier in accordance with an embodiment. As shown in FIG. 4A, graphical illustration 400 presents four possible modulation points $405_0$-$405_3$ for a frequency carrier. As further shown, a received signal Yi 410 also is illustrated. Note that there may be multiple, namely four, possible channel estimates per frequency carrier. with the modulation points {1,j,−1, −j}, one of the 4 channel estimates (Yi; 1j*Yi; −Yi; −1j*Yi) will fall on received signal 410, because h_est=Yi/ mod_point. Accordingly, referring now to FIG. 4B, shown is a graphical illustration of four possible channel estimates $h_0$-$h_3$ for a given frequency carrier.

A channel estimate can be determined solely by using information of a single carrier; however there may be excessive noise which may impact accuracy. In embodiments, information of neighboring carriers may be considered in determining channel estimates. As such, some averaging may be performed, leveraging information from one or more neighbor carriers to a given carrier at issue.

Figure 4C:
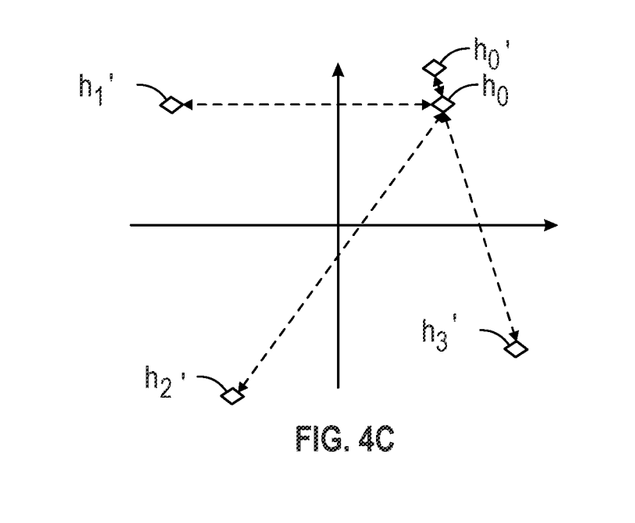
FIGS. 4C and 4D are graphical illustrations of neighboring channel estimates used in accordance with an embodiment.
Figure 4D:
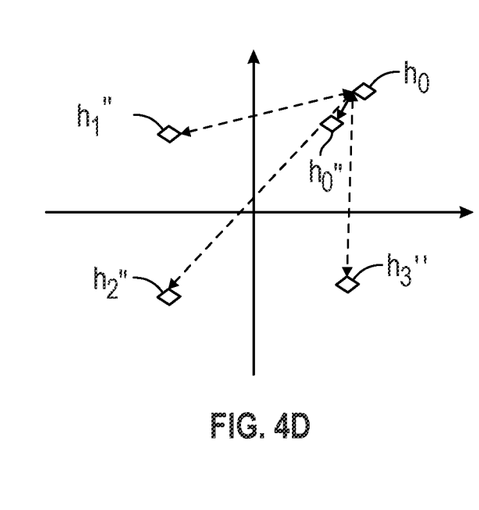

To average between channel estimates in accordance with an embodiment, any one of the four channel estimates for a carrier under analysis may be selected. Thus with reference back to FIG. 4B, assume that channel estimate $h_0$ is selected. Next, channel estimates from one or more neighboring carriers can be selected as well. Referring to FIGS. 4C and 4D, channel estimates for neighboring carriers are shown, with relation to the selected channel estimate $h_0$ for a carrier under analysis. Thus as shown in FIG. 4C, from four channel estimates $h_0'$-$h_3'$ for a first neighboring carrier, channel estimate $h_0'$ is selected since it is closest to $h_0$. And in turn with regard to FIG. 4D, from four channel estimates $h_0''$-$h_3''$ for a second neighboring carrier, channel estimate $h_0''$ is selected since it is closest to $h_0$.

Thus with these selected channel estimates of three neighboring carriers, a channel estimation may be performed, e.g., according to a simple average, as shown in Equation 2.

$$h_{est}=(h_0+h_0'+h_0'')/3 \quad \text{[Equation 2]}$$

Note that while Equation 2 may be used to perform a simple average for determining a channel estimate, in other cases a weighted average may be used; however, a performance impact of such weighted average calculation may be negligible such that the simpler average calculation instead may be used, in an embodiment. Note that these 3 channel estimates are for illustration purpose; in embodiments, N×M channel estimates can be used for averaging using a moving window, where N is how many carriers' channel estimates are used from the current OFDM symbol (frequency axis) and M is how many carriers' channel estimates are used from other OFDM symbols (time axis), where N and M are configurable.

Note that any one of the channel estimates for a carrier under analysis may be selected. This is so, as each of the other channel estimates have a known relation to $h_0$, as shown in Equations 3-5.

$$hest(1)=hest(0)*exp(1jpi/2) \quad \text{[Equation 3]}$$

$$hest(2)=-hest(0) \quad \text{[Equation 4]}$$

$$hest(3)=hest(0)*exp(-1jpi/2) \quad \text{[Equation 5]}$$

Note that using any of hest(0), hest(1), hest(2) and hest(3) in the LLR calculation will give identical results due to the symmetric nature of the modulation points. Various LLR calculations may be performed based at least in part on this channel estimate determined using a selected channel estimate of multiple neighboring carriers. To illustrate these LLR calculations, consider modulation points that are generated as a result of encoding in a transmitter.

Figure 5A:
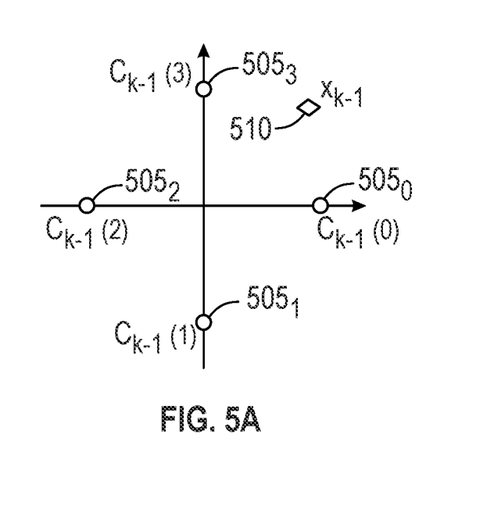
FIGS. 5A and 5B are graphical illustrations of possible modulation points for a received frequency carrier.
Figure 5B:
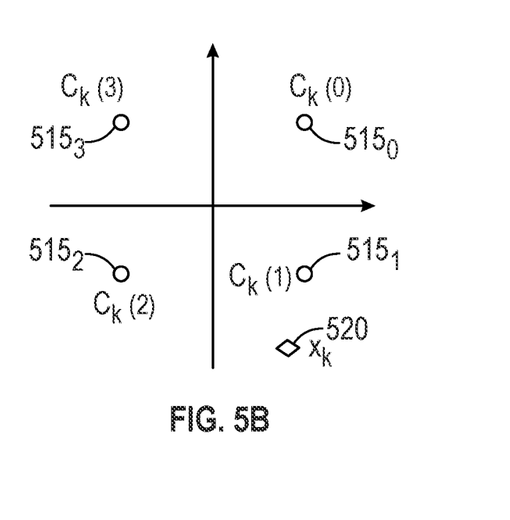

Referring now to FIGS. 5A and 5B, shown are graphical illustrations of possible modulation points for a received frequency carrier. As shown in FIGS. 5A and 5B two neighboring carriers, namely a first frequency carrier at symbol k−1 in FIG. 5A and a succeeding carrier at symbol k in FIG. 5B, each may have four possible modulation points $505_0$-$505_3$ and $515_0$-$515_3$, respectively. In addition, as shown each illustration also includes a received signal, 510 and 520, respectively. With this arrangement, Equations 6 and 7 illustrate representative LLR calculations for each respective bit (of a 2-bit value).

$$LLR(0) = \max_{a \in (\text{bit}(0) = 1)} \text{Re}\{C_{k-1} * h * (x_k a * + x_{k-1})\} - \max_{a \in (\text{bit}(0) = 0)} \text{Re}\{C_{k-1} * h * (x_k a * + x_{k-1})\} \quad \text{[Equation 6]}$$

$$LLR(1) = \max_{a \in (\text{bit}(1) = 1)} \text{Re}\{C_{k-1} * h * (x_k a * + x_{k-1})\} - \max_{a \in (\text{bit}(1) = 0)} \text{Re}\{C_{k-1} * h * (x_k a * + x_{k-1})\} \quad \text{[Equation 7]}$$

According to these Equations, the LLR represents a measure of the likelihood that a given bit of a symbol is a logic 0 or logic 1 value. In Equations 6 and 7, the following values are used:

$C_{k-1}$—modulation point after encoder (4 options)

h—channel estimation $x_k$—received signal

α—information phase change, a={exp(jpi/4), exp(3jpi/4), exp(5jpi/4), exp(7jpi/4)}

In the above Equations, half of the 'α' values correspond to bit=0 and the other half correspond to bit=1. These halves are different for LLR(0) and LLR(1). Also note that in DAB, differential encoding is applied across the time dimension, but embodiments are also applicable in the case when differential encoding is applied across the frequency dimension. With Equations 6 and 7 above, to check all possible modulation point values for corresponding frequency carriers of two symbols, 8 calculations may be performed for each of the possible phase changes. However, in certain hardware implementations, various optimizations can be performed to reduce these number of calculations as information phase change may only take on two of the four possible values.

While the above Equations 6 and 7 may be used to identify LLR values for two bits of a modulation point using information from a single neighboring sample (i.e., for a common frequency carrier of two adjacent symbols), embodiments may more accurately determine LLR values using information obtained from multiple frequency carriers of a plurality of symbols within an evaluation window.

To this end, embodiments may leverage information from one or more neighboring symbols to a symbol under analysis and further may leverage information of neighboring frequency carriers of both the symbol of interest and one or more neighboring symbols.

Figure 6:
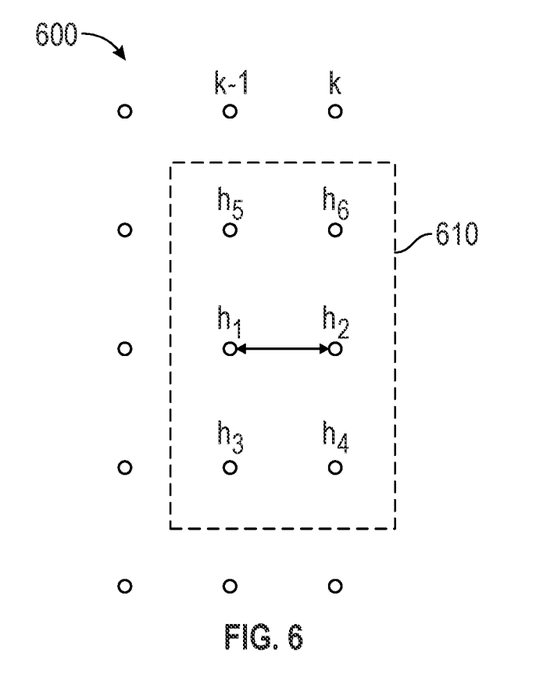
FIG. 6 is a graphical illustration of an evaluation window in accordance with an embodiment.

Referring now to FIG. 6, shown is a graphical illustration of an evaluation window in accordance with an embodiment. As shown in FIG. 6, a graphical illustration 600 includes a plurality of frequency carriers (representative carriers of two adjacent OFDM symbols k−1 and k are enumerated). As further shown, an evaluation window 610 includes a plurality of frequency carriers of these two symbols. In addition, channel estimates $h_1$-$h_6$, each associated with a given one of the frequency carriers, are illustrated. In embodiments herein, channel estimation information from these 6 frequency carriers may be used in determining LLR values for a given phase change between 2 carriers (here a carrier associated with channel estimate $h_1$). Understand while in FIG. 6, evaluation window 610 is illustrated that includes carriers of two adjacent symbols, and is further formed of three adjacent frequency carriers in each of these symbols, embodiments are not limited in this regard and larger or smaller evaluation windows may be used in other embodiments. In some embodiments, a control circuit of a receiver may dynamically configure the size of the evaluation window based on operating conditions, modulation scheme or so forth.

Techniques to efficiently determine LLR values in accordance with embodiments may be performed in various locations. For example, some implementations may determine these values in general-purpose processing circuitry such as a DSP or other programmable controller, microcontroller or so forth that executes instructions stored in a non-transitory storage medium such as firmware and/or software instructions. Instead in other embodiments, dedicated hardware circuitry may be provided to determine LLR values.

Figure 7:
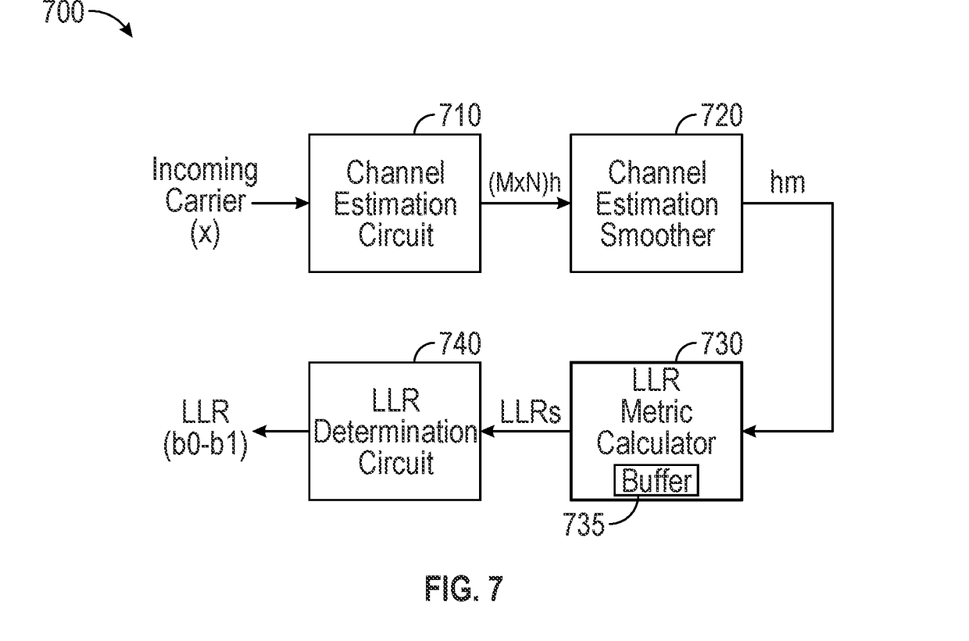
FIG. 7 is a block diagram of a coherent differential equalization circuit in accordance with an embodiment.

Referring now to FIG. 7, shown is a block diagram of a coherent differential equalization circuit in accordance with an embodiment. In an embodiment, coherent differential equalization circuit 700 may be implemented as a differential detector such as differential detector 270 of FIG. 2. As shown in FIG. 7, coherent differential equalization circuit 700 itself may include multiple hardware blocks. Incoming frequency carriers (X) may be received in a channel estimation circuit 710. In embodiments, channel estimation circuit 710 may determine one or more channel estimates for each incoming carrier. In a particular embodiment, there may be N×M channel estimates determined, with N and M configurable as discussed above. In turn, these N×M channel estimates are provided to a channel estimation smoother 720. In various embodiments, channel estimation smoother 720 may include buffering circuitry that may be configured to determine a channel estimate for a given frequency carrier that is an average of channel estimations for multiple frequency carriers including neighboring carriers to a given frequency carrier of interest. For example, channel estimation smoother 720 may be configured to generate a channel estimate in accordance with Equation 2 above.

Still with reference to FIG. 7, in turn this channel estimate ($h_m$) is provided to a LLR metric calculator 730. In embodiments herein, LLR metric calculator 730 may generate LLR metrics with respect to a pair of frequency carriers of interest (differential) using information from that frequency carrier and additional frequency carriers in an evaluation window with the carrier of interest. To this end, LLR metric calculator 730 may determine multiple metrics for a given pair of frequency carriers of interest (differential) using Equations 8-11. Note that the calculated LLR metrics may be stored in a buffer 735 included in LLR metric calculator 730 or coupled thereto.

In an embodiment these LLR metrics are as follows:

$$LLR(b0, m, 1) = \max_{a \in (bit(0) = 1)} \text{Re}\{C_{k-1} * h_m * (x_k a * + x_{k-1})\} \quad \text{[Equation 8]}$$

$$LLR(b0, m, 0) = \max_{a \in (bit(0) = 0)} \text{Re}\{C_{k-1} * h_m * (x_k a * + x_{k-1})\} \quad \text{[Equation 9]}$$

$$LLR(b1, m, 1) = \max_{a \in (bit(1) = 1)} \text{Re}\{C_{k-1} * h_m * (x_k a * + x_{k-1})\} \quad \text{[Equation 10]}$$

$$LLR(b1, m, 0) = \max_{a \in (bit(1) = 0)} \text{Re}\{C_{k-1} * h_m * (x_k a * + x_{k-1})\} \quad \text{[Equation 11]}$$

These metrics rely on the same variables described above as to Equations 6 and 7, and may be determined to obtain a likelihood that a given bit of each of m frequency carriers is either a logic 0 or logic 1.

Referring still to FIG. 7, these LLR metrics may be provided in turn to an LLR determination circuit 740. In embodiments herein, LLR determination circuit 740 may determine an LLR value for each of multiple bits of a pair of frequency carriers, e.g., using Equations 12-13 below. As such, LLR determination circuit 740 outputs these LLR values. In an embodiment, the LLR values correspond to a probability that each of the 2 bits (b0-b1) of the carrier are a logic 0 or a logic 1. Note that these LLR values are thus soft decisions for the bits of the pair of frequency carriers and may be provided to additional circuitry of the receiver, such as a channel decoder. Understand while shown at this high level in the embodiment of FIG. 7, many variations and alternatives are possible.

$$LLR(b0) = \max_{m = 1:6}\{LLR(b0, m, 1)\} - \max_{m = 1:6}\{LLR(b0, m, 0)\} \quad \text{[Equation 12]}$$

$$LLR(b1) = \max_{m = 1:6}\{LLR(b1, m, 1)\} - \max_{m = 1:6}\{LLR(b1, m, 0)\} \quad \text{[Equation 13]}$$

Figure 8:
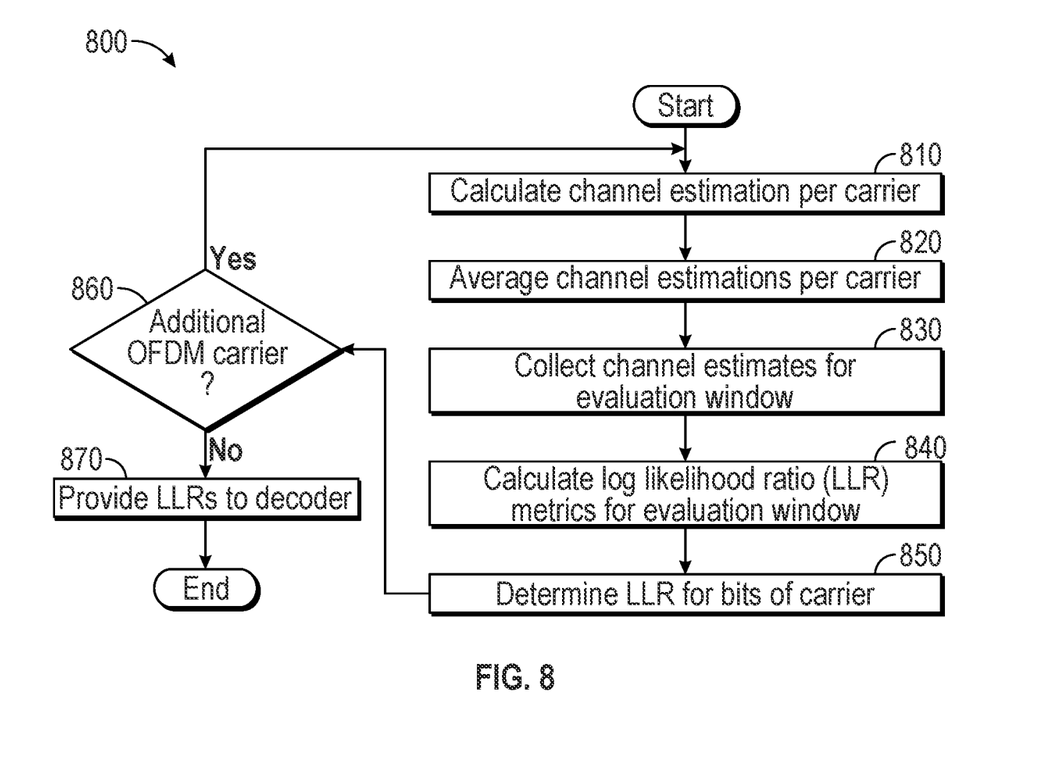
FIG. 8 is a flow diagram of a method in accordance with an embodiment.

Referring now to FIG. 8, shown is a flow diagram of a method in accordance with an embodiment. More specifically, method 800 is a method for determining channel estimates according to a blind channel estimate technique and using the resulting channel estimates to calculate LLR values. In an embodiment, method 800 may be performed by a hardware circuit of a receiver, such as a channel estimation circuit that in turn may be implemented within a differential detector. Understand that the channel estimation circuit itself may include or be associated with LLR calculation circuitry, such as shown in coherent differential equalization 700 of FIG. 7.

As shown, method 800 begins by calculating a channel estimation per carrier (block 810). In an embodiment, a selected one of multiple possible channel estimates for a given frequency carrier may be determined. Next at block 820 channel estimates per carrier may be determined according to an averaging process. In an embodiment this channel estimation may be calculated using channel estimates of multiple carriers within an evaluation window as discussed above.

Still with reference to FIG. 8, next at block 830 channel estimates may be collected for an evaluation window. Note that the collected channel estimates can be temporarily stored, e.g., in a buffer. Then at block 840 LLR metrics may be calculated for the evaluation window. In an embodiment, such LLR metrics may be calculated according to Equations 8-11. Next at block 850 an LLR for bits of a given pair of carriers can be determined. More specifically as described herein the calculated LLR metrics for the evaluation window may be used in determining the LLRs, which may occur according to Equations 12-13 above.

Still referring to FIG. 8, next it is determined whether there are additional OFDM carriers for a given symbol under analysis (diamond 860). If so, control passes to block 810, discussed above. Otherwise the LLRs for the symbol may be buffered and provided as soft decisions to a decoder when a full decoder block is received (block 870), so that channel decoding may be performed. Note that a full decoder block may formed of a given number of OFDM symbols. Understand while shown at this high level in the embodiment of FIG. 8, many variations and alternatives are possible.

For example, as discussed above in determination of LLR metrics, it is possible to perform certain optimizations to reduce compute complexity. As one example, when considering possible modulation points in, e.g., any of Equations 8-11, when a multiplication has a factor of $e^{j\pi/4k}$ or $e^{j\pi k}$ the multiplication can be simplified to:

$$(a+jb)e^{j\pi/4k}(a+jb)e^{j\pi k}$$

$$(a+b+j(b-a))/\text{sqrt}(2)a+jb$$

$$(a-b+j(a+b))/\text{sqrt}(2)-a-jb$$

$$(-a-b+j(a-b))/\text{sqrt}(2)b-ja$$

$$(b-a-j(a+b))/\text{sqrt}(2)-b+ja$$

Determining each of the four different $C_{k-1}$ can be performed as follows:

$$\max\{\text{Re}\{C_{k-1}*h_m'(x_ka'+x_{k-1})\}\}=\max\{\text{Re}\{C_{k-1}(0)*X\},\text{Re}\{C_{k-1}(1)*X\},\text{Re}\{C_{k-1}(2)*X\},\text{Re}\{C_{k-1}(3)*X\}\}$$

As another optimization, since these modulation points are 90 degrees from each other, the determination may be implemented as below.

$$\text{MAX}(\text{ABS}(\text{real}(X),\text{ABS}(\text{imag}(X));$$

$$\text{MAX}(\text{real}(X)-\text{imag}(X),\text{real}(X)+\text{imag}(X))/\text{sqrt}(2);$$

Figure 9:
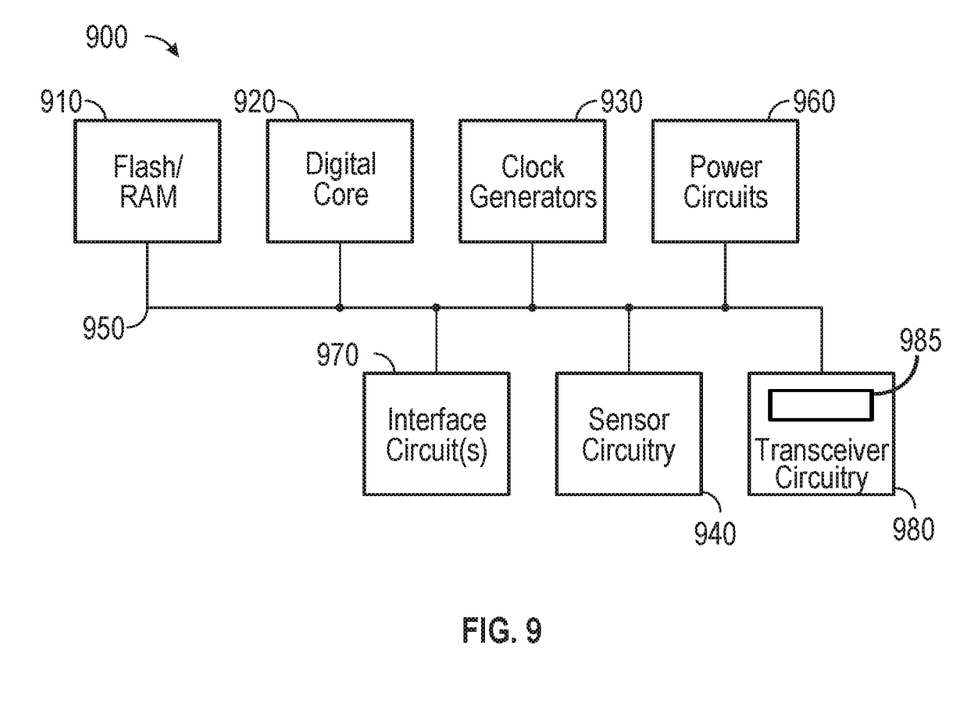
FIG. 9 is a block diagram of a representative device in accordance with an embodiment.

Embodiments may be implemented in many different types of end node devices. Referring now to FIG. 9, shown is a block diagram of a representative device 900 which may be a given wireless device. In the embodiment shown in FIG. 9, device 900 may be a standalone radio, or a radio incorporated into another device such as a sensor, actuator, controller or other device that can be used in a variety of use cases in a wireless control network, including sensing, metering, monitoring, embedded applications, communications applications and so forth.

In the embodiment shown, device 900 includes a memory system 910 which in an embodiment may include a non-volatile memory such as a flash memory and volatile storage, such as RAM. In an embodiment, this non-volatile memory may be implemented as a non-transitory storage medium that can store instructions and data, including code for performing methods including the method of FIG. 8. Memory system 910 couples via a bus 950 to a digital core 920, which may include one or more cores and/or microcontrollers that act as a main processing unit of the device. As further shown, digital core 920 may couple to clock generators 930 which may provide one or more phase locked loops or other clock generation circuitry to generate various clocks for use by circuitry of the device. As further illustrated, device 900 further includes power circuitry 970, which may include one or more voltage regulators.

Additional circuitry may optionally be present depending on particular implementation to provide various functionality and interaction with external devices. Such circuitry may include interface circuitry 960 which may provide interface with various off-chip devices, sensor circuitry 940 which may include various on-chip sensors including digital and analog sensors to sense desired signals, such as speech inputs, image inputs, environmental inputs or so forth.

In addition as shown in FIG. 9, transceiver circuitry 980 may be provided to enable transmission and receipt of wireless signals, e.g., according to one or more digital radio communication standards such as DAB, DRM or HD™ radio, local area wireless communication schemes, such as a given IEEE 802.11 scheme, wide area wireless communication scheme such as LTE or 9G, among others. And as shown transceiver circuitry 980 includes a coherent differential equalizer circuit 985, which may perform channel estimations and use the channel estimate information to generate soft decisions, as described herein. Understand while shown with this high level view, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a front end circuit to receive incoming radio frequency signals and process the incoming radio frequency signals into a plurality of orthogonal frequency division multiplexing samples of a plurality of orthogonal frequency division multiplexing symbols;
   a fast Fourier transform engine coupled to the front end circuit, the fast Fourier transform engine to receive the plurality of orthogonal frequency division multiplexing samples and convert the plurality of orthogonal frequency division multiplexing samples into a plurality of frequency carriers;
   a detector coupled to the fast Fourier transform engine, the detector to determine a channel estimate for a first frequency carrier using a first channel estimate for the first frequency carrier and a plurality of other channel estimates, each of the plurality of other channel estimates for one of a plurality of neighboring frequency carriers within an evaluation window, and determine a log likelihood ratio for the first frequency carrier using the channel estimate for the first frequency carrier; and
   a decoder coupled to the detector to decode a first orthogonal frequency division multiplexing symbol including the first frequency carrier using the log likelihood ratio for the first frequency carrier.

2. The apparatus of claim 1, wherein the detector is to determine the channel estimate for the first frequency carrier including an average value determined using the first channel estimate and the plurality of other channel estimates.

3. The apparatus of claim 2, wherein the evaluation window includes a first plurality of frequency carriers of the first orthogonal frequency division multiplexing symbol and a second plurality of frequency carriers of a second orthogonal frequency division multiplexing symbol adjacent to the first orthogonal frequency division multiplexing symbol.

4. The apparatus of claim 1, wherein the detector is to:
   calculate a plurality of metrics for the first frequency carrier and the plurality of neighboring frequency carriers within the evaluation window; and
   determine the log likelihood ratio for a pair of frequency carriers including the first frequency carrier and a second frequency carrier based at least in part on the plurality of metrics.

5. The apparatus of claim 4, wherein the detector is to determine the log likelihood ratio for the pair of frequency carriers including the first frequency carrier and the second frequency carrier including:

for a first bit of the first orthogonal frequency division multiplexing symbol, a difference between a first maximum metric of the plurality of metrics for a first value for the first bit and a second maximum metric of the plurality of metrics for a second value for the first bit; and for a second bit of the first orthogonal frequency division multiplexing symbol, a difference between a first maximum metric of the plurality of metrics for the first value for the second bit and a second maximum metric of the plurality of metrics for the second value for the second bit.

6. The apparatus of claim 4, wherein the detector includes:
a channel estimation circuit to generate a plurality of channel estimates for the first frequency carrier, the plurality of channel estimates including the first channel estimate; and
a channel estimation smoother to determine the channel estimate for the first frequency carrier using the first channel estimate and the plurality of other channel estimates.

7. The apparatus of claim 6, wherein the detector further includes:
a metric calculator coupled to the channel estimation smoother to calculate the plurality of metrics using the first channel estimate; and
a buffer to store the plurality of metrics.

8. The apparatus of claim 7, wherein the detector further includes a determination circuit coupled to the metric calculator to determine the log likelihood ratio for the pair of frequency carriers and the plurality of neighboring frequency carriers within the evaluation window.

9. A method comprising:
receiving radio frequency signals with a front end circuit of a wireless device, and converting the radio frequency signals into frequency domain data;
determining, in a channel estimation circuit of receiver of the wireless device, and based on the frequency domain data, a plurality of channel estimates within an evaluation window having a plurality of frequency carriers including a first frequency carrier, each of the plurality of channel estimates for one of the plurality of frequency carriers;
calculating, in a calculation circuit of the receiver, a plurality of metrics for each of the plurality of frequency carriers using at least some of the plurality of channel estimates; and
determining a soft decision for the first frequency carrier based at least in part on the plurality of metrics; and
performing coherent demodulation for a differentially encoded quadrature phase shift keying orthogonal frequency division multiplexing symbol using the soft decision.

10. The method of claim 9, wherein determining a first channel estimate for the first frequency carrier including calculating an average of an initial channel estimate for the first frequency carrier and initial channel estimates for a plurality of other frequency carriers of the plurality of frequency carriers.

11. The method of claim 10, further comprising selecting the initial channel estimate for the plurality of other frequency carriers including a channel estimate closest to the initial channel estimate for the first frequency carrier.

12. A method comprising:
receiving radio frequency signals with a front end circuit of a wireless device, and converting the radio frequency signals into frequency domain data;
determining, in a channel estimation circuit of a receiver of the wireless device, and based on the frequency domain data, a plurality of channel estimates within an evaluation window having a plurality of frequency carriers including a first frequency carrier, each of the plurality of channel estimates for one of the plurality of frequency carriers;
calculating, in a calculation circuit of the receiver, a plurality of metrics for each of the plurality of frequency carriers using at least some of the plurality of channel estimates, by calculating first, second, third, and fourth log likelihood ratio metrics for each of the plurality of frequency carriers of the evaluation window, the first log likelihood ratio metric corresponding to a likelihood that a first bit of a modulation point of the frequency carrier is a first value, the second log likelihood ratio metric corresponding to a likelihood that the first bit of the modulation point is a second value, the third log likelihood ratio metric corresponding to a likelihood that a second bit of the modulation point is the first value, and the fourth log likelihood ratio metric corresponding to a likelihood that the second bit of the modulation point is the second value; and
determining a soft decision for the first frequency carrier based at least in part on the plurality of metrics.

13. The method of claim 12, further comprising determining a first log likelihood ratio value and a second log likelihood ratio value based at least in part on the first, second, third, and fourth log likelihood ratio metrics.

14. The method of claim 13, wherein the soft decision includes the first log likelihood ratio value and the second log likelihood ratio value.

15. The method of claim 12, further comprising performing coherent demodulation for a differentially encoded quadrature phase shift keying orthogonal frequency division multiplexing symbol using the soft decision.

16. An apparatus comprising:
means for determining a plurality of channel estimates within an evaluation window having a plurality of frequency carriers including a first frequency carrier, each of the plurality of channel estimates for one of the plurality of frequency carriers, the means for determining configured to calculate an average of an initial channel estimate for the first frequency carrier and initial channel estimates for a plurality of other frequency carriers of the plurality of frequency carriers;
means for calculating a plurality of metrics for each of the plurality of frequency carriers using at least some of the plurality of channel estimates;
means for determining a soft decision for the first frequency carrier based at least in part on the plurality of metrics; and
means for selecting the initial channel estimate for the plurality of other frequency carriers including a channel estimate closest to the initial channel estimate for the first frequency carrier.

17. An apparatus comprising:
means for determining a plurality of channel estimates within an evaluation window having a plurality of frequency carriers including a first frequency carrier, each of the plurality of channel estimates for one of the plurality of frequency carriers;
means for calculating a plurality of metrics for each of the plurality of frequency carriers using at least some of the plurality of channel estimates, the means for calculating including means for calculating first, second, third, and fourth log likelihood ratio metrics for each of the plurality of frequency carriers of the evaluation window, the first log likelihood ratio metric corresponding to a likelihood that a first bit of a modulation point of the frequency carrier is a first value, the second log likelihood ratio metric corresponding to a likelihood that the first bit of the modulation point is a second value, the third log likelihood ratio metric corresponding to a likelihood that a second bit of the modulation point is the first value, and the fourth log likelihood ratio metric corresponding to a likelihood that the second bit of the modulation point is the second value; and means for determining a soft decision for the first frequency carrier based at least in part on the plurality of metrics.

18. The apparatus of claim 17, wherein the means for determining is to calculate an average of an initial channel estimate for the first frequency carrier and initial channel estimates for a plurality of other frequency carriers of the plurality of frequency carriers.

19. The apparatus of claim 18, further comprising means for selecting the initial channel estimate for the plurality of other frequency carriers including a channel estimate closest to the initial channel estimate for the first frequency carrier.

20. The apparatus of claim 17, further comprising means for determining a first log likelihood ratio value and a second log likelihood ratio value based at least in part on the first, second, third, and fourth log likelihood ratio metrics.

\* \* \* \* \*